United States Patent
Kim

(10) Patent No.: US 10,847,285 B1
(45) Date of Patent: Nov. 24, 2020

(54) ELECTRIC WIRE WITH COOLING FUNCTION

(71) Applicants: Hyundai Motor Company, Seoul (KR); Kia Motors Corporation, Seoul (KR)

(72) Inventor: Mi Ru Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/884,741

(22) Filed: May 27, 2020

(30) Foreign Application Priority Data

Dec. 16, 2019 (KR) .......................... 10-2019-0167531

(51) Int. Cl.
*H01B 7/42* (2006.01)

(52) U.S. Cl.
CPC .................................... *H01B 7/423* (2013.01)

(58) Field of Classification Search
CPC .......... H01B 7/42; H01B 7/421; H01B 7/423; H01B 7/425; H01B 7/426; H01B 7/428
USPC ........................................ 174/15.1, 15.2, 36
See application file for complete search history.

(56) References Cited

U.S. PATENT DOCUMENTS

| | | | | |
|---|---|---|---|---|
| 3,773,965 A * | 11/1973 | Reynolds | .............. | B32B 27/304 |
| | | | | 174/25 G |
| 4,394,534 A * | 7/1983 | Bahder | .................. | H01B 12/02 |
| | | | | 174/15.5 |
| 7,009,104 B2 * | 3/2006 | Spreafico | ............... | H01B 12/14 |
| | | | | 174/15.5 |
| 2013/0269966 A1 * | 10/2013 | Emme | ................... | H01B 7/423 |
| | | | | 174/15.6 |
| 2018/0351230 A1 | 12/2018 | Kumar et al. | | |
| 2019/0237218 A1 * | 8/2019 | Heyne | .................. | B60L 53/302 |

* cited by examiner

*Primary Examiner* — William H. Mayo, III
(74) *Attorney, Agent, or Firm* — Mintz Levin Cohn Ferris Glovsky and Popeo, P.C.; Peter F. Corless

(57) ABSTRACT

The electric wire is a heat pipe type of electric wire and includes a wick part having a channel in an internal space in which a refrigerant in a gas state with a phase changed by heat flows, and passing the refrigerant in a liquid state with the phase changed by heat using a capillary phenomenon. A conductive part surrounds and seals the wick part and is made of a conductive material and an insulating cover insulates the conductive part from the outside by surrounding the conductive part. The insulating cover has one or more via holes exposing the conductive part to the outside.

10 Claims, 4 Drawing Sheets

ELECTRIC WIRE WITH COOLING FUNCTION

CROSS-REFERENCE TO RELATED APPLICATION

This application claims priority to Korean Patent Application No. 10-2019-0167531, filed on Dec. 16, 2019, the disclosure of which is incorporated herein by reference.

BACKGROUND

1. Field of the Disclosure

The present disclosure relates to an electric wire with a cooling function and, more particularly, an electric wire with a cooling function, the electric wire providing a cooling function using a heat exchange principle of a heat pipe.

2. Description of the Prior Art

Recently, studies regarding various electric vehicles have been conducted with technological development and environmental problems. Accordingly, attempts have been undertaken for replacing the internal combustion engine that is a conventional power source with an electric device. Recently, various electric parts are being used in vehicles and parts such as an on-board charger (OBC), an inverter, and a low voltage direct current-direct converter (LDC) are applied for conversion of electric energy.

An on-board charger (OBC) is a device configured to charge a high-voltage battery for an electric vehicle and a plug-in hybrid vehicle by receiving and converting common alternating current (AC) power (110/220V) into direct current (DC) power capable of charging a high-voltage battery. The inverter is a device configured to supply energy for driving a motor by converting DC battery power into 3-phase AC power.

Further, the low DC-DC Converter (LDC) is a device configured to convert high-power voltage into a low voltage of 12V to be used in a vehicle. In this power conversion device, elements such as a transformer, an inductor, a noise filter, a power semiconductor, and a diode are used and these parts generate a substantial amount of heat due to high frequency/high power. In particular, the transformer, the inductor, and the noise filter of the passive elements include parts made of soft ferrite and soft ferrite has a defect that it is vulnerable to high temperature. Therefore, recently, deterioration of performance due to an increase in temperature is minimized by additionally using an expensive material capable of operating at a high temperature or by providing a cooling system.

On the other hand, a current does not flow well to the center area of the area in which the current flows in passive elements while a current flows in the passive elements due to proximity effect and skin effect that are generated in the passive elements. Recently, the operation speed continuously increasing for the efficiency and downsizing of power conversion parts. However, the higher the operation frequency, the more the influence of proximity effect and skin effect increases, and thus research regarding the influence of proximity effect and skin effect and plans for preventing heat generation are required.

Research has been conducted regarding an electric wire capable of transmitting a current and having a cooling function by improving the structure of a heat pipe by considering that a current does not flow well to the center area but most of the current flows through the surface area of the area in which the current flows due to proximity effect and skin effect. Meanwhile, a heat pipe, which is a component using a heat exchange effect in which a phase change of a refrigerant flowing therein occurs, is applied to various parts requiring a cooling function.

The description provided above as a related art of the present disclosure is merely for helping understanding the background of the present disclosure and should not be construed as being included in the related art known by those skilled in the art.

SUMMARY

The present disclosure provides an electric wire having a cooling function, the electric wire being able to achieve a cooling function using a heat exchange principle of a heat pipe.

An electric wire having a cooling function according to an exemplary embodiment of the present disclosure is a heat pipe type of electric wire and may include: a wick part having a channel in an internal space to allow a refrigerant in a gas state with a phase changed by heat to flow, and passing the refrigerant in a liquid state with the phase changed by heat using a capillary phenomenon; a conductive part that surrounds and seals the wick part and is made of a conductive material; and an insulating cover that insulates the conductive part from the outside by surrounding the conductive part, and having one or more via holes (e.g., holes of a via) exposing the conductive part to the outside.

The conductive part may have a pipe shape with both ends thereof sealed, and the wick part may be in close contact with an inner surface of the conductive part with a predetermined thickness. The wick part may be a structure having a mesh or groove shape and inducing a capillary phenomenon. The conductive part may be made of copper (Cu), and the insulating cover may be made of a macromolecular material. The via holes formed at the insulating cover may be via holes for conducting electricity. The conductive part may have an expansion area by expanding a surface area at at least any portion.

According to an exemplary embodiment of the present disclosure, by applying a heat pipe structure to an electric wire that transmits and supplies a current, it may be possible to manufacture an electric wire that allows a current to flow and is expected to provide a cooling function. Further, it may be possible to expect a cooling function while minimizing reduction of flow of a current even if a heat pipe structure is employed, by using the fact that a current usually flows through the surface of an electric wire due to the influence by proximity effect and skin effect while the current flows through the electric wire.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1A:
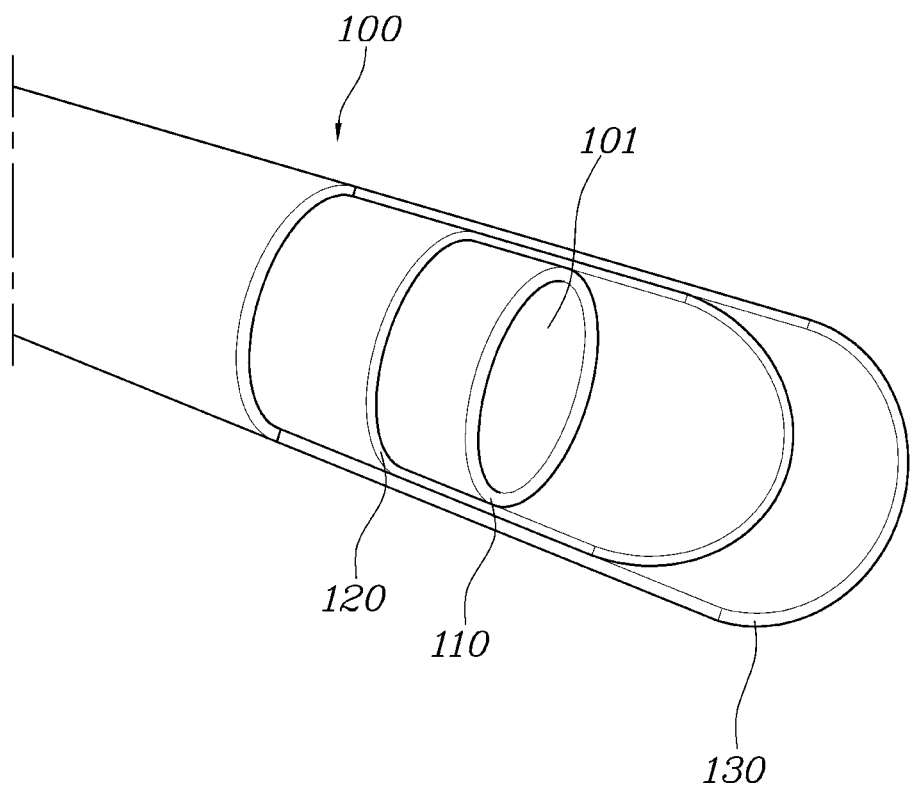
FIG. 1A is a view showing the structure of an electric wire having a cooling function according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the present disclosure are described in detail with reference to the accompanying drawings. However, the present disclosure is not limited to the following exemplary embodiments and can be implemented in various ways different from one another, and the exemplary embodiments are provided to complete the present disclosure and to completely inform those skilled in art of the scope of the present disclosure. The same components are given the same reference number in the drawings.

Figure 1B:
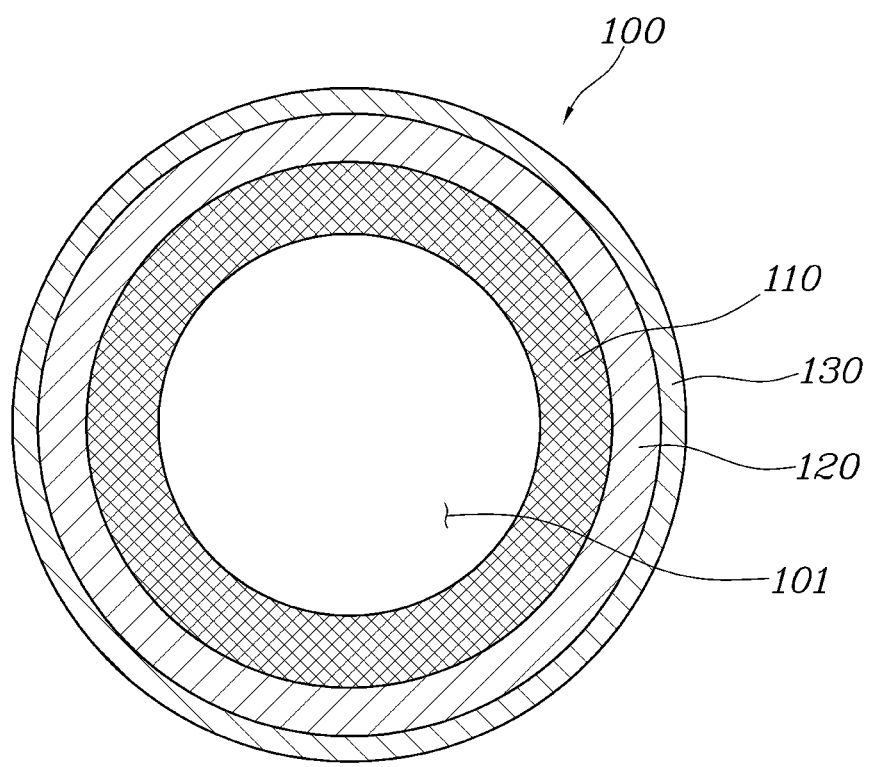
FIG. 1B is a view showing a cross-section of the electric wire having a cooling function according to an exemplary embodiment of the present disclosure.
Figure 2:
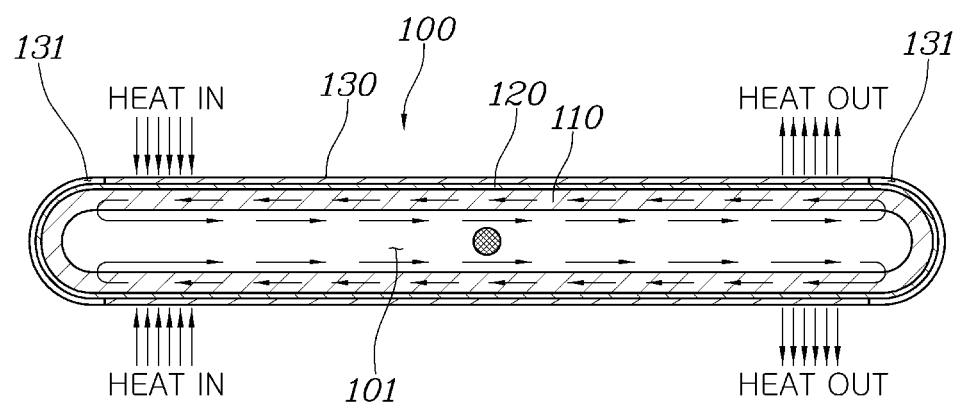
FIG. 2 is a view showing the operation principle of the electric wire having a cooling function according to an exemplary embodiment of the present disclosure.
Figure 3:
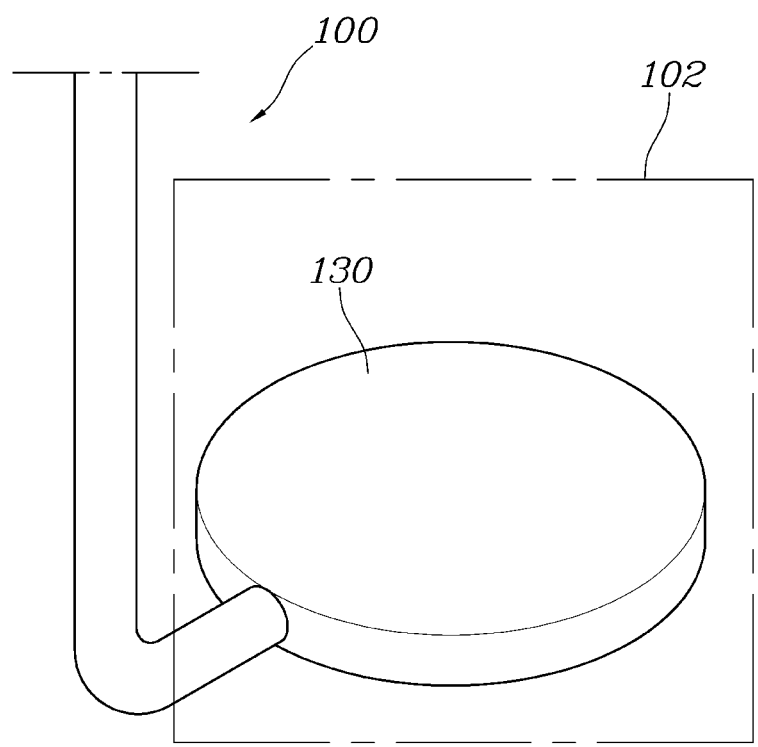
FIG. 3 is a view showing the main part of an electric wire having a cooling function according to another exemplary embodiment of the present disclosure.

FIG. 1A is a view showing the structure of an electric wire having a cooling function according to an exemplary embodiment of the present disclosure, FIG. 1B is a view showing a cross-section of the electric wire having a cooling function according to an exemplary embodiment of the present disclosure, FIG. 2 is a view showing the operation principle of the electric wire having a cooling function according to an exemplary embodiment of the present disclosure, and FIG. 3 is a view showing the main part of an electric wire having a cooling function according to another exemplary embodiment of the present disclosure.

As shown in the figures, an electric wire 100 having a cooling function according to an exemplary embodiment of the present disclosure may have an entirely heat pipe-shaped structure. For example, the electric wire 100 having a cooling function according to an exemplary embodiment of the present disclosure may be formed by sequentially disposing a wick part 110, a conductive part 120, and an insulating cover 130 outward from the inside.

The wick part 110, which is a structure in which a refrigerant that exchanges heat while changing a phase between gas and liquid due to heat, may maintain an entirely hollow pipe shape. Accordingly, a channel 101 may be formed in the hollow inside of the wick part 110 to allow a refrigerant in a gas state with the phase changed by heat, and a refrigerant in a liquid state with the phase changed by heat to move to the wick part 110 by a capillary phenomenon. Accordingly, the wick part 110 may be a structure that induces a capillary phenomenon. Additionally, the wick part 110 may be formed in a mesh or groove shape.

The conductive part 120, which is a structure that allows a current to flow while transmitting heat exchanged by a phase change of a refrigerant in the wick part 110 to the outside, maintains an entirely hollow pipe shape similar to the wick part 110. Both ends of the conductive part 120 may be closed to seal the inside thereof. Accordingly, the wick part 110 may be disposed inside the conductive part 120 and the wick part 110 may be surrounded and sealed. The conductive part 120 may be made of a conductive material to transmit heat and electricity. For example, a metal material having high conductivity may be used for the conductive part 120. The conductive part may be made of copper (Cu). The insulating cover 130 may insulate the conductive part 120 through which electricity flows from the outside.

Accordingly, insulating cover 130 may surround the conductive part 120. However, at least two or more via holes 131 and 132 may be formed at the insulating cover 130 to electrically connect the conductive part 120 to the outside and transmit heat. Accordingly, the conductive part 120 may be exposed to the outside through the via holes 131 and 132.

Additionally, the insulating cover 130 may be made of a macromolecular material to have insulation. For example, the insulating cover 130 may be made of polyolefin resin, polyvinyl chloride, elastomer, fluoropolymer, etc. Accordingly, the insulating cover 130 may be formed by applying such macromolecular materials to the surface of the conductive part 120. The material of the insulating cover 130 is not limited to the macromolecular materials and various materials having insulation may be used. For example, the insulating cover 130 may be formed by forming a conductive film through organic/inorganic varnish coating using enamel.

The via hole 131 formed at the insulating cover 130 may be provided for electrical conduction. The number and size of holes 131 may be varied, if necessary. Further, the via hole 131 allows electricity to flow by bringing the conductive part 120 in contact with an electrical part. The operation state of the electric wire having a cooling function that has the configuration described above is described.

As shown in FIG. 2, when heat is generated outward from the inside of the electric wire 100, the heat transfers to a refrigerant. When the heat transfers to the refrigerant, the refrigerant changes in phase from liquid to gas and moves to an area at a low temperature along the channel 101 by a temperature gradient. The refrigerant in a liquid state discharges heat while changing in phase from gas to liquid by surrounding temperature. Additionally, the refrigerant changing in phase to liquid circulates along the wick part 110 by a capillary phenomenon of the wick part 110.

Meanwhile, since the conductive part 120 of the electric wire 100 may be made of a conductive material, electricity may flow by bringing an external electrical part in contact with the conductive part. On the other hand, it may be possible to expand the surface area of the portion where the electrical wire and a cooler are in contact to improve the effect of discharging heat of the electric wire.

As shown in FIG. 3, an expansion area 102 may be formed by expanding the surface at at least any one portion of the conductive part 120 of the electric wire. Accordingly, it may be possible to increase the heat discharge effect through the expansion area 102 of the surface. It may also be possible to further improve the heat discharge effect by bringing the expansion area 102 partially or entirely in contact with a cooler through a thermal compound. The usage state of the electric wire having a cooling function that has the configuration described above is described with reference to the figures.

Figure 4:
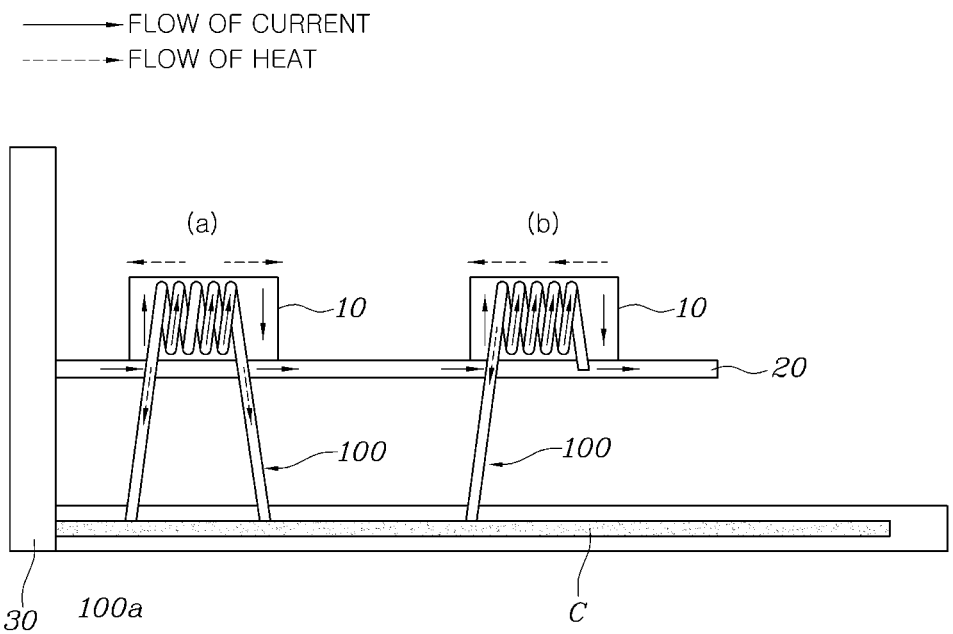
FIGS. 4 to 5 are views showing the configuration of a part employing the electric wire having a cooling function according to an exemplary embodiment of the present disclosure.
Figure 5:
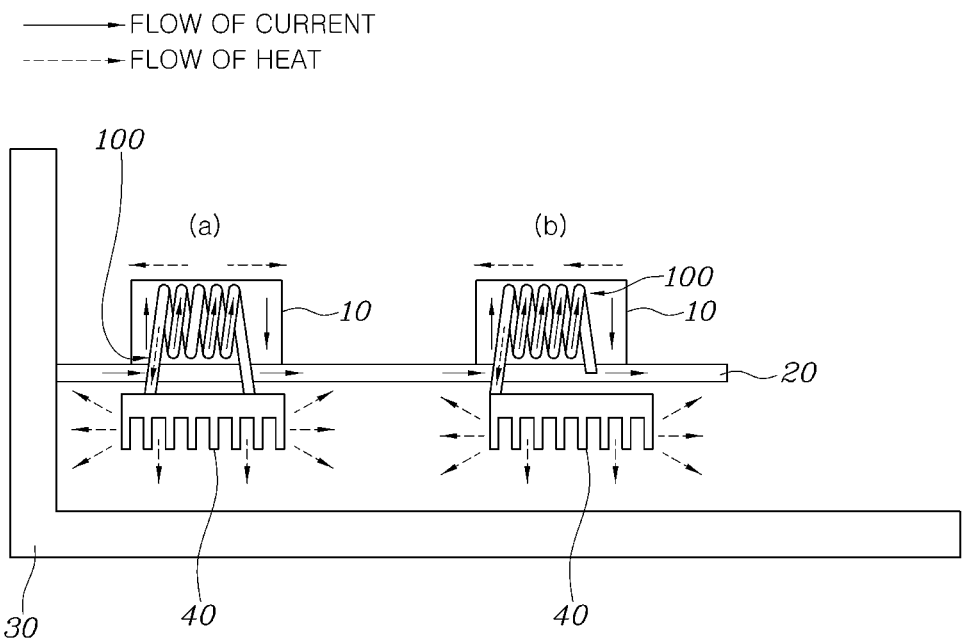

FIGS. 4 to 5 are views showing the configuration of a part employing the electric wire having a cooling function according to an exemplary embodiment of the present disclosure. First, FIG. 4 illustrates the electric wire 100 having a cooling function according to the present disclosure applied to a passive element 10 and the passive element 10 may be mounted on a printed circulate board (PCB) 20 having a water-cooling structure.

In particular, area (a) of FIG. 4 relates to an exemplary embodiment in which the passive element 10 employing the electric wire 100 is mounted on the PCB 20 and heat transfers to both ends from the center portion of the electric wire 100, and schematically shows a structure that discharges heat while allowing a current to flow using the electric wire 100.

As shown in (a) of FIG. 4, the electric wire 100 may be prepared, the center portion may be positioned inside the passive element 10, and both ends of the electric wire 100 may be electrically and thermally connected to each other by passing through the PCB 20. The PCB 20 and the electric wire 100 may be electrically connected through the via hole 131. Accordingly, a current may flow into the passive element 10 by the conductive part 120 connected to the passive element 10 through the via hole 131. When heat is generated in the passive element 10 due to operation of the passive element 10, heat may transfer to both ends from the center portion of the electric wire 100 through the wick part 110 of the electric wire 100 and then may be discharged outside through the ends of the electric wire 100.

Further, area (b) of FIG. 4 relates to an exemplary embodiment in which the passive element employing the electric wire 100 may be mounted on the PCB 20 and heat may transfer from a first end to a second end of the electric wire 100, and schematically shows a structure that discharges heat while allowing a current to flow using the electric wire 100. As shown in (b) of FIG. 4, the electric wire 100 may be prepared and then applied to the passive element 10. Further, a first end thereof may be connected to the PCB 20 and a second end may be thermally and electrically connected through the PCB 20. The PCB 20 and the electric wire 100 may be electrically connected through the via hole 131.

Accordingly, a current may flow into the passive element by the conductive part 120 connected to the passive element 10 through the via hole 131. When heat is generated in the passive element 10 due to operation of the passive element 10, heat may transfer from a first end to a second end of the electric wire 100 through the wick part 110 of the electric wire 100 and may be then discharged outside through the second end of the electric wire 100.

A cooler in which cooling water C flows may be disposed around the position where the second end of the electric wire 100 is disposed and the first end of the electric wire 100 may be connected in direct or indirect contact with the cooling water C to improve heat discharge efficiency. Further, the cooler may be thermally connected to the PCB 20 through the housing 30, thereby being able to remove the heat transferring to the PCB 20.

Moreover, FIG. 5 illustrates the electric wire having a cooling function according to the present disclosure applied to a passive element and the passive element is connected to cooling fins. Area (a) of FIG. 5 relates to an exemplary embodiment in which the passive element 10 employing the electric wire 100 may be mounted on the PCB 20 and heat may transfer to both ends from the center portion of the electric wire 100, and schematically shows a structure that discharges heat while allowing a current to flow using the electric wire 100.

As shown in (a) of FIG. 5, the electric wire 100 may be prepared, the center portion may be positioned inside the passive element 10, and both ends of the electric wire 100 may be electrically and thermally connected to each other by passing through the PCB 20. The PCB 20 and the electric wire 100 may be electrically connected through the via hole 131. Accordingly, a current may flow into the passive element by the conductive part 120 connected to the passive element 10 through the via hole 131.

Both ends of the electric wire may be directly connected to the cooling fins 40, thereby being thermally brought in contact with them. Accordingly, when heat is generated in the passive element 10 due to operation of the passive element 10, heat may transfer to both ends from the center portion of the electric wire 100 through the wick part 110 of the electric wire 100 and then may be discharged outside through the cooling fins 40 from the both ends of the electric wire 100.

Additionally, area (b) FIG. 5 relates to an exemplary embodiment in which the passive element 10 employing the electric wire 100 may be mounted on the PCB 20 and heat may transfer from a first end to a second end of the electric wire 100, and schematically shows a structure that discharges heat while allowing a current to flow using the electric wire 100. As shown in (b) FIG. 5, the electric wire 100 may be prepared and then applied to the passive element 10. Further, a first end thereof may be connected to the PCB 20 and a second end may be thermally and electrically connected through the PCB 20. The PCB 20 and the electric wire may be electrically connected through the via hole 131. Accordingly, a current may flow into the passive element by the conductive part 120 connected to the passive element 10 through the via hole 131.

The second end of the electric wire may be directly connected to the cooling fins 40, thereby being thermally brought in contact with them. Accordingly, when heat is generated in the passive element 10 due to operation of the passive element 10, heat may transfer to the second end of the electric wire 100 through the wick part 110 of the electric wire 100 and then may be discharged outside through the cooling fins 40 from the of the electric wire 100.

Although the present disclosure was described above with reference to the accompanying drawings and exemplary embodiments, the present disclosure is not limited thereto, but is limited to the following claims. Accordingly, those skilled in the art may change and modify the present disclosure in various ways without departing from the spirit of the claims.

What is claimed is:

1. An electric wire having a cooling function that is a heat pipe type of electric wire, comprising:
   a wick part having a channel in an internal space in which a refrigerant in a gas state with a phase changed by heat flows, and passing the refrigerant in a liquid state with the phase changed by heat using a capillary phenomenon;
   a conductive part that surrounds and seals the wick part and is made of a conductive material; and
   an insulating cover that insulates the conductive part from the outside by surrounding the conductive part, and having one or more via holes exposing the conductive part to the outside.

2. The electric wire of claim 1, wherein the conductive part has a pipe shape with both ends sealed, and the wick part is in abutting contact with an inner surface of the conductive part with a predetermined thickness.

3. The electric wire of claim 1, wherein the wick part is a structure having a mesh or groove shape and inducing a capillary phenomenon.

4. The electric wire of claim 1, wherein the conductive part is made of copper (Cu).

5. The electric wire of claim 1, wherein the insulating cover is made of a macromolecular material.

6. The electric wire of claim 1, wherein the via holes formed at the insulating cover are via holes for conducting electricity.

7. The electric wire of claim 6, wherein the conductive part has an expansion area by expanding a surface area at at least any portion.

8. An electric vehicle having an electric wire having a cooling function that is a heat pipe type of electric wire, wherein the electric wire includes:
   a wick part having a channel in an internal space in which a refrigerant in a gas state with a phase changed by heat flows, and passing the refrigerant in a liquid state with the phase changed by heat using a capillary phenomenon;
   a conductive part that surrounds and seals the wick part and is made of a conductive material; and
   an insulating cover that insulates the conductive part from the outside by surrounding the conductive part, and having one or more via holes exposing the conductive part to the outside.

9. The electric vehicle of claim 8, wherein the conductive part has a pipe shape with both ends sealed, and the wick part is in abutting contact with an inner surface of the conductive part with a predetermined thickness.

10. The electric vehicle of claim 8, wherein the wick part is a structure having a mesh or groove shape and inducing a capillary phenomenon.

* * * * *